Patented Apr. 7, 1936

2,036,481

UNITED STATES PATENT OFFICE 2,036,481

PROCESS FOR THE MANUFACTURE OF FERTILIZERS AND COMPOSITIONS

Walter H. Kniskern, Petersburg, Va., and Leonard V. Rohner, Syracuse, N. Y., assignors to Atmospheric Nitrogen Corporation, New York, N. Y., a corporation of New York No Drawing. Application March 1, 1934, Serial No. 713,518

17 Claims. (Cl. 71—9)

This invention relates to compositions containing ammonia, calcium nitrate and ammonium nitrate; to processes for their preparation; to methods for the transportation of ammonia and said fertilizer salts in the form of said compositions; and the use of these compositions in the production of fertilizers.

The methods for the fixation of atmospheric nitrogen, which have gone into extensive commercial use, make available for industrial purposes and particularly for the production of fertilizers large quantities of fixed nitrogen, in the form of ammonia. The ammonia may be industrially used as such, or it may be oxidized to form oxides of nitrogen which may be absorbed in milk of lime or in a suspension of limestone to form calcium nitrate. The oxides of nitrogen also may be absorbed in water to form nitric acid which may then be utilized to prepare calcium nitrate and ammonium nitrate, both of which are valuable fertilizer ingredients.

The production and marketing of ammonia, either as free ammonia or in combination as ammonium salts, and of calcium nitrate, is attended by difficulties and expensive operations. Liquid anhydrous ammonia itself has a relatively high vapor pressure at ordinary temperatures. Accordingly, in order to ship and handle the ammonia in this form, precautions must be taken to prevent losses of ammonia. In the case of ammonia shipped in the form of aqua ammonia, a large portion of the transportation costs go for the transportation of the valueless water. Furthermore in the preparation of ammonium nitrate and calcium nitrate by the reaction of nitrogen oxides or nitric acid with ammonia and calcium oxide or calcium carbonate respectively, large amounts of water are used which must be evaporated in order to obtain the solid salts. Especially is this difficult, and expensive in the case of calcium nitrate, since the concentrated solutions of this salt are evaporated only with difficulty and the calcium nitrate melt obtained is a viscous mass which readily supercools before solidifying and which has, after solidifying, the property of avidly absorbing moisture from the atmosphere to form hydrates and of caking, which makes its transportation and storage difficult. Solid ammonium nitrate also is hygroscopic and cakes during storage. The tendency which both ammonium nitrate and calcium nitrate have to cake makes necessary the expense of crushing the caked salts before incorporating them with other ingredients in making mixed fertilizers.

It is frequently desirable to prepare fertilizers containing nitrogen, as well as $P_2O_5$ derived from material such as superphosphate. It has been proposed to prepare such fertilizers by treating superphosphate with ammonia. When ammonia is added to a superphosphate in relatively large amounts, however, the ammonia tends to cause water and citrate soluble $P_2O_5$ in the superphosphate, both of which are considered available as plant food, to revert to citrate insoluble $P_2O_5$, which is not considered available to plants. There is, therefore, a limited amount of nitrogen which may be added as free ammonia in treating a superphosphate with ammonia or other ammoniacal material. For certain purposes, however, it is desirable to have fertilizers containing more nitrogen than may be obtained by ammoniating superphosphate. Furthermore, it is advantageous to have fertilizers containing both nitrate and ammoniacal nitrogen, since the two forms apparently complement each other in stimulating the development of plants at different stages of growth. Where nitrate nitrogen is provided in combination with a cation such as calcium the further advantage is gained that this combination gives an alkaline tendency after application to the soil.

It is accordingly, an object of this invention to provide a composition of matter comprising ammoniacal solutions of ammonium nitrate and calcium nitrate and containing a relatively large proportion of total nitrogen, and more particularly, a relatively high proportion of nitrate nitrogen to ammoniacal nitrogen in the composition. It is a further object of this invention to provide methods for the economical and ready transportation of fixed nitrogen in the form of ammonia and of calcium nitrate and ammonium nitrate, and a transportable package suitable for the economical and convenient transportation of said fixed nitrogen. Another object of this invention is to provide a process for the production of fertilizers from superphosphate, which fertilizers contain an increased proportion of nitrate nitrogen, by treating a monocalcium acid phosphate material, superphosphate or triple superphosphate, for example, or mixtures containing the same, with a liquid composition comprising ammonia, ammonium nitrate and calcium nitrate.

This invention comprises new compositions consisting of solutions of ammonium nitrate and calcium nitrate in ammoniacal liquids such as anhydrous liquid ammonia or aqua ammonia and processes for the preparation of said ammoniacal solutions which comprises the mixing of anhydrous or aqua ammonia with ammonium nitrate and calcium nitrate as solids, solutions, or slurries. The invention furthermore comprises methods for the transportation of said ammoniacal solutions in closed containers under their own vapor pressures and also a transportable package, wherein said ammoniacal solutions may be transported, comprising a closed container within which the ammoniacal solutions may be safely and conveniently preserved and transported under their own vapor pressures. The invention also comprises processes for the production of fertilizer compositions which involve treating acidic fertilizing materials with ammoniacal solutions of calcium nitrate and ammonium nitrate.

In the preparation of fertilizers containing a high proportion of nitrogen by the treatment of a superphosphate with an ammoniacal material, it is important that basic ammonia is not added to the superphosphate in amount sufficient to cause excessive reversion of citrate soluble phosphate to citrate insoluble phosphate. It is further frequently desirable that the ratio of nitrate nitrogen to ammoniacal nitrogen be high since the nitrate nitrogen is immediately available to the soil, thus providing immediate fertilizing action, whereas the ammoniacal nitrogen usually undergoes slow transformations before it may be utilized, thus providing a more prolonged fertilizer action.

Although it has long been known that nitrogen might be incorporated in fertilizers by ammoniation of an acidic material, such as superphosphate, with ammonia alone, the extent of the ammoniation is very definitely limited by the fact that when large quantities of ammonia are added to a superphosphate, reversion of the citrate soluble phosphate to citrate insoluble phosphate occurs.

In treating superphosphate with ammonia, a proportion of nitrogen combined as a salt (salt nitrogen) may be added by employing a solution of ammonium nitrate in an ammoniacal liquid, but the amount of ammonium nitrate which may be added in such a process is limited by the solubility of the salt in the amount of ammoniacal liquid which may be used without causing undue reversion of the citrate soluble phosphate. Moreover, the ratio of nitrate nitrogen to ammoniacal nitrogen in compositions thus prepared is limited, as for instance to 0.38 when a solution of ammonium nitrate in anhydrous liquid ammonia salting out at 0° C. or below is employed.

By treating a superphosphate with a solution of calcium nitrate in an ammoniacal liquid the amount of nitrogen which may be incorporated with the superphosphate, without adding an excessive amount of free ammonia, may be increased by dissolving calcium nitrate in the ammoniacal liquid. The amount of total nitrogen (both salt nitrogen and free ammonia nitrogen) which may be added following this procedure is also limited by the solubility of the calcium nitrate in the amount of ammoniacal liquid which may be used without causing undue reversion of citrate soluble phosphate. Similarly the ratio of nitrate nitrogen to ammoniacal nitrogen in ammoniacal solutions of calcium nitrate is limited by the solubility of the calcium nitrate. For example, this ratio is not more than 0.21 for solutions of calcium nitrate, in an ammoniacal liquid containing 82 parts of ammonia for every 18 parts of water, which salt out only at a temperature of 0° C. or below.

We have discovered that the solubility of calcium nitrate in ammoniacal solutions may be materially increased by the addition of ammonium nitrate. The resulting solutions contain a high percentage of nitrogen and more particularly a high percentage of nitrogen in salt form. Furthermore, by this means the ratio of nitrate nitrogen to ammoniacal nitrogen is increased far above the figure obtainable by the addition of either calcium nitrate or ammonium nitrate alone. These solutions are valuable also due to the fact that although they contain large quantities of dissolved salt they retain the fluid condition at temperatures commonly prevailing, even in the winter time. It has been observed, furthermore, that the addition of ammonium nitrate to ammoniacal calcium nitrate solutions tends to decrease the turbidity due to magnesium compounds which occurs in the ammoniacal calcium nitrate solutions. This effect reduces the possibility of the formation of slimes of magnesium salts on the insides of containers.

These compositions are particularly adaptable to being transported and handled, since they remain as liquids even at relatively low temperatures and are particularly suitable for use in the preparation of mixed fertilizers by adding the compositions to an acidic material such as superphosphate or triple superphosphate, since they contain relatively high proportions of combined nitrogen to the nitrogen present as free ammonia. In the following table there are shown the compositions of solutions in anhydrous liquid ammonia, in aqua ammonia containing small amounts of water, and in aqua ammonia containing about 50 per cent ammonia and 50 per cent water, of calcium nitrate, both with and without ammonium nitrate, for various temperatures at which a solid phase might salt out from the solution.

Table 1

Compositions of solutions saturated with $NH_4NO_3$, $Ca(NO_3)_2$, and/or complexes containing these materials

| | Salting out temp. °C. | Composition, weight percent | | | | Percent total N | Pounds $NH_4NO_3$ Lb. $NH_3$ | Pounds $Ca(NO_3)_2$ Lb. $NH_3$ | Salt N Free $NH_3$ —N | Nitrate N $NH_4+NH_3$ N |
|---|---|---|---|---|---|---|---|---|---|---|
| | | $NH_4NO_3$ | $Ca(NO_3)_2$ | $NH_3$ | $H_2O$ | | | | | |
| Mol. ratio of $Ca(NO_3)_2$ to $H_2O$ approximately 1:2 | | | | | | | | | | |
| (1) | 0 | 0 | 45 | 45 | 10 | 44.7 | 0 | 1.00 | 0.21 | 0.21 |
| (2) | 0 | 45.0 | 16.4 | 35.0 | 3.6 | 47.3 | 1.29 | 0.47 | 0.64 | 0.29 |
| (3) | 5.5 | 10.0 | 39.4 | 42.0 | 8.6 | 44.8 | 0.24 | 0.94 | 0.29 | |
| (4) | 7.2 | 66.0 | 8.2 | 24.0 | 1.8 | 44.2 | 2.75 | 0.34 | 1.24 | |
| (5) | −2 | 30.0 | 25.4 | 39.0 | 5.6 | 46.9 | 0.77 | 0.65 | 0.46 | |
| (6) | 0 | 74.6 | 0 | 25.4 | 0 | 47.0 | 2.94 | 0 | 1.25 | 0.38 |
| Solutions in approximately 50 percent aqua $NH_3$ | | | | | | | | | | |
| (7) | 0 | 0.0 | 50.0 | 25.0 | 25.0 | 29.1 | 0 | 2.00 | 0.41 | 0.41 |
| (8) | 0 | 25.0 | 40.0 | 17.5 | 17.5 | 29.9 | 1.43 | 2.28 | 1.08 | 0.60 |
| (9) | 0 | 63.4 | 0 | 18.3 | 18.3 | 37.3 | 3.47 | 0 | 1.47 | 0.42 |
| (10) | 2.5 | 10.0 | 50.0 | 20.0 | 20.0 | 28.5 | 0.50 | 2.50 | 0.73 | |
| (11) | −3 | 49.0 | 13.0 | 19.0 | 19.0 | 34.9 | 2.58 | 0.68 | 1.24 | |

Consideration of Table 1, lines 1 and 2, shows that, by the addition of ammonium nitrate to a solution of calcium nitrate in liquid ammonia containing only a small amount of water and salting out at 0°, the ratio of salt nitrogen to free ammonia nitrogen may be increased from 0.21 to 0.64. In the case of solutions of calcium nitrate in approximately 50% aqua ammonia salting out at 0° it may be seen from lines 7 and 8 that the ratio of salt nitrogen to free ammonia nitrogen may be increased from 0.41 to 1.08 while at the same time the addition of ammonium nitrate causes an increase in the solubility of calcium nitrate in the solution of from 2.00 lbs. per lb. $NH_3$ to 2.28 lbs. per lb. $NH_3$.

With regard to the ratio of nitrate nitrogen to ammoniacal nitrogen: The data given in line 1 of Table 1 show that the ratio of nitrate nitrogen to ammoniacal nitrogen in a solution of calcium nitrate in liquid ammonia containing a small quantity of water and salting out at 0° C. is 0.21. Line 2 shows that the ratio of nitrate nitrogen to ammoniacal nitrogen can be increased to 0.29 in $NH_4NO_3$—$Ca(NO_3)_2$—$NH_3$—$H_2O$ solutions containing small amounts of water and saturated at 0° C., as compared with 0.21 for similar $$Ca(NO_3)_2—NH_3—H_2O$$

solutions. In 50% aqua ammonia solutions the effect of addition of ammonium nitrate is even more marked. Lines 7, 8 and 9 indicate that for solutions of 50% aqua ammonia, with salting out temperature of 0° C., the ratio of 0.60 for nitrate nitrogen to ammoniacal nitrogen can be attained in solutions containing both $NH_4NO_3$ and $Ca(NO_3)_2$, as compared with 0.41 for solutions containing $Ca(NO_3)_2$ alone and 0.42 for solutions containing $NH_4NO_3$ alone.

The liquid compositions of this invention present numerous practical advantages from the viewpoint of the marketing of nitrogenous materials and the production of nitrogen-phosphorus fertilizers. By addition of ammonium nitrate to solutions of calcium nitrate in aqua ammonia, it is possible in many cases to increase the amount of calcium nitrate which may be dissolved in a given quantity of ammonia and still obtain compositions which will not crystallize within the range of atmospheric temperatures, and the possibility of shipping and utilizing such liquids without any difficulty arising from crystallization makes them of especial value.

The presence of ammonium nitrate and calcium nitrate in anhydrous or aqua ammonia causes a marked lowering of the vapor pressure of the ammoniacal solutions of this invention, as may be seen from the following table, which shows the vapor pressure relationships of ammoniacal solutions of calcium nitrate and ammonium nitrate.

Table 2

Vapor pressure in the system $NH_4NO_3$—$Ca(NO_3)_2$—$NH_3$—$H_2O$

| | Salting out temp. | $NH_3$ / $NH_3+H_2O$ | Composition—Weight percent | | | | Vapor pressure atm. gauge | | | | |
|---|---|---|---|---|---|---|---|---|---|---|---|
| | | | $NH_4NO_3$ | $Ca(NO_3)_2$ | $NH_3$ | $H_2O$ | 0° C. | 10° C. | 20° C. | 30° C. | 40° C. |
| (1) | 0° C. | 0.91 | 45.0 | 16.4 | 35.0 | 3.6 | .4 | 1.0 | 1.7 | 2.6 | 3.9 |
| (2) | | 0.91 | 0 | 0 | 91 | 9 | 2.7 | 4.4 | 6.6 | 9.4 | 13.2 |
| (3) | 0° C. | 0.51 | 24.9 | 39.9 | 17.8 | 17.4 | −0.87 | −0.79 | −0.66 | −0.49 | −0.23 |
| (4) | | 0.51 | 0 | 0 | 51 | 49 | 0.2 | 0.8 | 1.6 | 2.75 | 4.2 |

From Table 2 line 2, it may be seen that a liquid containing 91% ammonia and 9% water has a vapor pressure of 2.7 atmospheres gauge at 0° C. and 13.2 at 40° C. By the addition of ammonium nitrate and calcium nitrate to such an ammoniacal liquid in the proportions given in line 1 of the table, the vapor pressure of the solution at 0° may be reduced to 0.4 atmosphere gauge and at 40° to only 3.9 atmospheres gauge. The data in line 4 is for a 51% aqua ammonia which has a vapor pressure of 0.2 atmosphere gauge at 0° and 4.2 atmospheres gauge at 40° C. Now, if ammonium nitrate and calcium nitrate be added to such a liquid in the proportions given in the table, line 3, the vapor pressure is reduced to −0.87 atmosphere gauge pressure at 0° C. and −0.23 atmosphere gauge pressure at 40° C. In other words, such a solution exerts a vapor pressure materially below atmospheric throughout the temperatures ordinarily met with.

Anhydrous liquid ammonia exerts a vapor pressure ranging from 3.2 atmospheres gauge to 14.3 atmospheres gauge between 0° C. and 40° C. By dissolving ammonium nitrate and calcium nitrate in anhydrous liquid ammonia, solutions having vapor pressures materially less than the vapor pressure of the liquid ammonia may be obtained.

Thus these solutions of ammonium nitrate and calcium nitrate in anhydrous or aqua ammonia provide a convenient means for transporting, storing and handling of ammonium nitrate, calcium nitrate and ammonia, since their relatively low vapor pressures allow the use of closed containers in which the solutions may be stored under their own vapor pressure without the containers being subjected to high internal pressures. In some cases the pressure may be atmospheric and the pressure of the composition itself constitute only a part of the total pressure within the container. Our invention accordingly comprises a transportable package comprising a closed container and within it a liquid composition described herein, under its own vapor pressure which constitutes either the whole or a part of the total pressure of the liquid.

The anhydrous solutions of this invention may be conveniently prepared by treating the desired proportions of dry calcium nitrate and ammonium nitrate with gaseous or liquid anhydrous ammonia. In making aqueous solutions, solutions, or slurries of calcium nitrate and ammonium nitrate in water may be treated with either aqua, gaseous or liquid anhydrous ammonia, or if desired, solid, moist calcium nitrate and ammonium nitrate may be dissolved in the desired strength of anhydrous liquid or aqua ammonia. Solutions or slurries of calcium nitrate and ammonium nitrate having any desired degree of concentration may be treated with ammonia. Furthermore, this invention permits of producing ammonium nitrate and calcium nitrate by absorbing ammonia in nitric acid solutions or by reacting milk of lime or calcium carbonate with nitric acid or nitrogen oxides, without necessitating a close control of the process in order to obtain a non-acid product such as is required where the solid salts are to be shipped. Where the compositions of this invention are used for the transportation and marketing of the calcium nitrate and ammonium nitrate the solutions in which the ammonia is absorbed may be operated with any desired degree of acidity or the solutions of calcium nitrate obtained by reacting calcium carbonate or calcium oxide with nitric acid or nitrogen oxides may have any desired content of free acid, since this acid is neutralized by the ammonia used in making up the ammoniacal solutions of this invention.

The methods suitable for the preparation of these solutions, therefore, facilitate putting the calcium nitrate, ammonium nitrate and ammonia into a form in which they may be moved readily to the market and provide liquid compositions which, at the usual atmospheric temperature conditions, does not throw down a precipitate of solid material, or if some precipitate should occur at extremely low temperatures, such as may be met with in the winter time, the crystallized solid may be redissolved by a slight warming of the solution.

The use of the compositions of this invention as a means for the transportation, storage, and handling of calcium nitrate, ammonium nitrate and ammonia obviates the difficulties arising in the marketing of the solid salts because of the property these solid salts have of caking together when stored, which frequently necessitates crushing of the caked mass before it may be utilized. The liquid compositions containing calcium nitrate, ammonium nitrate and ammonia on the other hand, may be readily utilized in the production of fertilizer materials containing superphosphate, for example, by mixing the liquid with the solid. This mixing may, if desired, be accomplished by spraying the liquid onto the solid material while it is being agitated in a mixing machine. The liquid compositions are suitable for spraying since they may be readily handled without their clogging the sprayer by the formation of solid material from the solution. The use of the liquid permits of a thorough dissemination of the calcium nitrate, ammonium nitrate and ammonia throughout the superphosphate material and the formation of substantially homogeneous fertilizer products having a satisfactory physical condition.

The following examples are illustrative of methods and their use in the production of fertilizers, but the invention is not limited to those examples or to the particular details described. The amounts of the various materials given in the examples are in parts by weight.

*Example 1.*—An ammoniacal solution of ammonium nitrate and calcium nitrate such as is shown in line 2, Table 1, may be prepared by dissolving about 45 parts of dry $NH_4NO_3$ and 20 parts of $Ca(NO_3)_2.2H_2O$ in 35 parts of liquid anhydrous ammonia. A solution results which does not salt out at temperatures above 0° C.

*Example 2.*—An aqueous ammoniacal solution containing ammonium nitrate and calcium nitrate such as is shown in line 8, Table 1, may be prepared by treating 76.7 parts of $Ca(NO_3)_2.4H_2O$ with 23.3 parts of liquid anhydrous ammonia to make a solution which at 0° would form a slurry, in the liquid part of which there would be about 2 parts of $Ca(NO_3)_2$ per part of free $NH_3$, and adding to every 100 parts of this calcium nitrate-ammonia composition about 33.3 parts of $NH_4NO_3$. The resulting solution does not salt out above about 0° C.

*Example 3.*—A complete fertilizer mixture may be prepared by adding about 114.5 parts of a solution having a composition approximately the same as that described in Example 1, to a mixture containing about 890 parts of superphosphate (18% $P_2O_5$), 125 parts of $(NH_4)_2SO_4$ (21% nitrogen), 160 parts of sulphate of potash (50% $K_2O$) and 710.5 parts of inert filler. The resulting mixture is in excellent physical condition immediately after ammoniation and also after cooling to atmospheric temperature. The product contains 4% N (of which about ⅔ was derived from the solution), 8% $P_2O_5$ and 4% $K_2O$. Approximately one-seventh of the total nitrogen in the mixture is in the nitrate form.

*Example 4.*—A solution having a composition approximately the same as that given in Example 2 is prepared and used in the preparation of a complete fertilizer mixture as follows. About 229 parts of the solution are added in a suitable manner to a mixture containing 890 parts of superphosphate (18% P₂O₅), 55 parts of (NH₄)₂SO₄ (21% nitrogen), 160 parts of muriate of potash (50% K₂O) and 666 parts of inert filler. The resulting mixture is in good physical condition immediately after preparation and also after cooling to atmospheric temperature. The product contains about 4% N (of which about 85% was derived from the solution), 8% P₂O₅, and 4% K₂O. Approximately one-third of the total nitrogen in the mixture is in the nitrate form.

If desired additional materials, such as sodium or potassium nitrate, ammonium sulphate, ammonium phosphate, urea, etc., or any two, or more of these materials, which in themselves are valuable fertilizers, may be incorporated with the ammoniacal solutions of this invention before they are added to the phosphate material, or these added materials may be incorporated with a phosphate material before, after or simultaneously with the treatment with the ammoniacal solution. In preparing the fertilizers of this invention, the several solid ingredients may if desired, be introduced into a mixer and simultaneously admixed therein with the ammoniacal solution which is preferably supplied as a spray to the materials while they are being admixed. Further, if desired, the superphosphate material may be ammoniated with the ammoniacal solution and this ammoniated material used as a fertilizer itself or it may be admixed with one or more additional fertilizer ingredients. The phrase "saturated with solid components" at a given temperature as used herein, refers to solutions of ammonium nitrate and calcium nitrate, from which a solid material containing calcium nitrate and/or ammonium nitrate (either of which may be in the solid form in combination with other components of the solution, particularly the ammonia) separates out from the solution when it is cooled to a lower temperature.

We claim:

1. As a new composition of matter, a solution of ammonium nitrate and calcium nitrate in an ammoniacal liquid, said solution containing a substantial proportion of ammonia and being substantially saturated with the aforesaid solid components at a temperature between about −30° C. to 30° C.

2. As a new composition of matter a solution of ammonium nitrate and calcium nitrate in an ammoniacal liquid, said solution containing a substantial proportion of ammonia and being substantially saturated with the aforesaid solid components at a temperature of about 0° C.

3. As a new composition of matter a solution of ammonium nitrate and calcium nitrate in anhydrous liquid ammonia substantially saturated with the aforesaid solid components at about −30° C. to 30° C.

4. As a new composition of matter a solution of ammonium nitrate and calcium nitrate in aqueous ammonia, said solution containing a substantial proportion of ammonia and being substantially saturated with the aforesaid solid components at about −30° C. to 30° C.

5. As a new composition of matter a solution of ammonium nitrate and calcium nitrate in 50% aqueous ammonia substantially saturated with the aforesaid solid components at about 0° C.

6. As a new composition of matter a solution of ammonium nitrate and calcium nitrate in aqueous ammonia, said solution containing a substantial proportion of ammonia and being substantially saturated with the aforesaid solid components at about 0° C. and containing about 2.5 parts of calcium nitrate per part of free ammonia.

7. As a new composition of matter a solution of ammonium nitrate and calcium nitrate in aqueous ammonia, said solution containing a substantial proportion of ammonia and being substantially saturated with the aforesaid solid components at about 0° C. and containing about 37% of the total nitrogen in the form of nitrate nitrogen.

8. The process for the preparation for transportation of ammonia and calcium nitrate which comprises mixing said ammonia and calcium nitrate and ammonium nitrate to form a liquid product which contains a substantial proportion of ammonia and which is substantially saturated with the aforesaid solid components at a temperature between about −30° C. and about 30° C.

9. A process for producing a fertilizer which comprises treating a superphosphate material with an ammoniacal solution of calcium nitrate and ammonium nitrate, said solution containing a substantial proportion of ammonia and being substantially saturated with the aforesaid solid components at a temperature between about −30° C. and 30° C.

10. A process for producing a fertilizer which comprises treating a superphosphate material with a liquid composition containing about 45 parts of ammonium nitrate, about 20 parts of calcium nitrate in about 35 parts of substantially anhydrous ammonia, said solution being added to the superphosphate material in the proportion of about 115 parts of the solution to about 890 parts superphosphate.

11. A process for producing a fertilizer which comprises treating a superphosphate material with a liquid composition containing about 92 parts Ca(NO₃)₂, about 57 parts NH₄NO₃, about 40 parts ammonia and about 40 parts water, said composition being added to the superphosphate material in the proportion of about 229 parts of solution to about 890 parts of superphosphate material.

12. A process for producing a fertilizer which comprises treating a solid acidic fertilizing material with an ammoniacal solution of calcium nitrate and ammonium nitrate, said solution containing a substantial proportion of ammonia and being substantially saturated with the aforesaid solid components at ordinary atmospheric temperatures.

13. A process for producing a fertilizer which comprises treating a superphosphate material with a solution of calcium nitrate and ammonium nitrate in 50% aqua ammonia, said solution prior to addition to the superphosphate material being saturated with the aforesaid solid components at ordinary atmospheric temperatures.

14. As a new composition of matter a solution of calcium nitrate and ammonium nitrate in about 50% aqua ammonia, said solution containing an amount of calcium nitrate dissolved therein in excess of that required for saturation of the aqua ammonia in the absence of the ammonium nitrate.

15. A process for the preparation for transportation of ammonia and calcium nitrate which comprises mixing about 50% aqua ammonia with calcium nitrate and ammonium nitrate to form a liquid containing dissolved calcium nitrate in excess of that required for saturation of the aqua ammonia in the absence of the ammonium nitrate.

16. A process for producing a fertilizer which comprises treating a solid acidic fertilizer material with a solution of calcium nitrate and ammonium nitrate in about 50% aqua ammonia, said solution containing an amount of calcium nitrate dissolved therein in excess of that required for saturation of the aqua ammonia in the absence of the ammonium nitrate.

17. A process for producing a fertilizer which comprises treating a superphosphate with a solution of calcium nitrate and ammonium nitrate in about 50% aqua ammonia, said solution containing an amount of calcium nitrate dissolved therein in excess of that soluble in said aqua ammonia in the absence of ammonium nitrate.

WALTER H. KNISKERN.
LEONARD V. ROHNER.